S. C. HARTSOCK.
FERTILIZER DISTRIBUTER.
APPLICATION FILED AUG. 28, 1919.
1,354,645.
Patented Oct. 5, 1920.
2 SHEETS—SHEET 2.
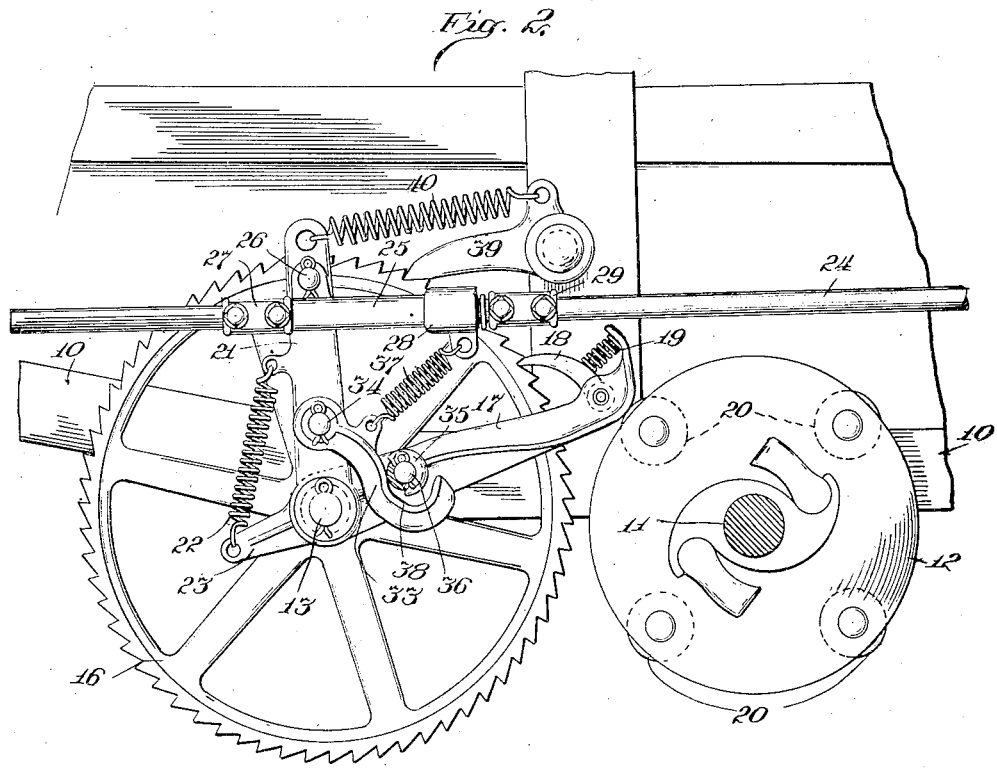
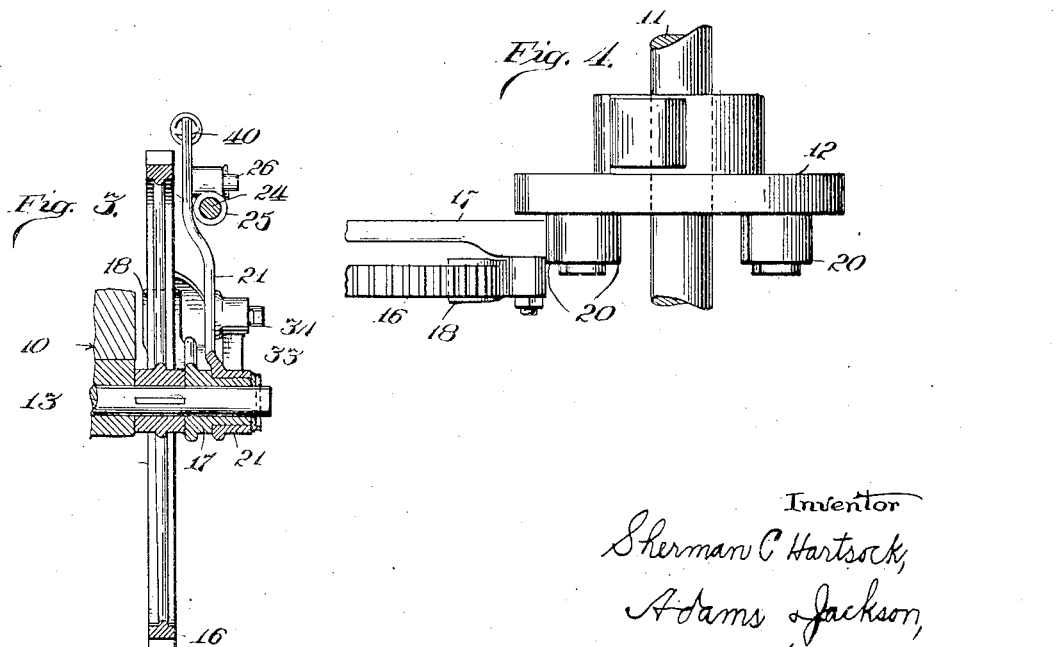
Inventor
Sherman C. Hartsock,
Adams & Jackson,
Attorneys

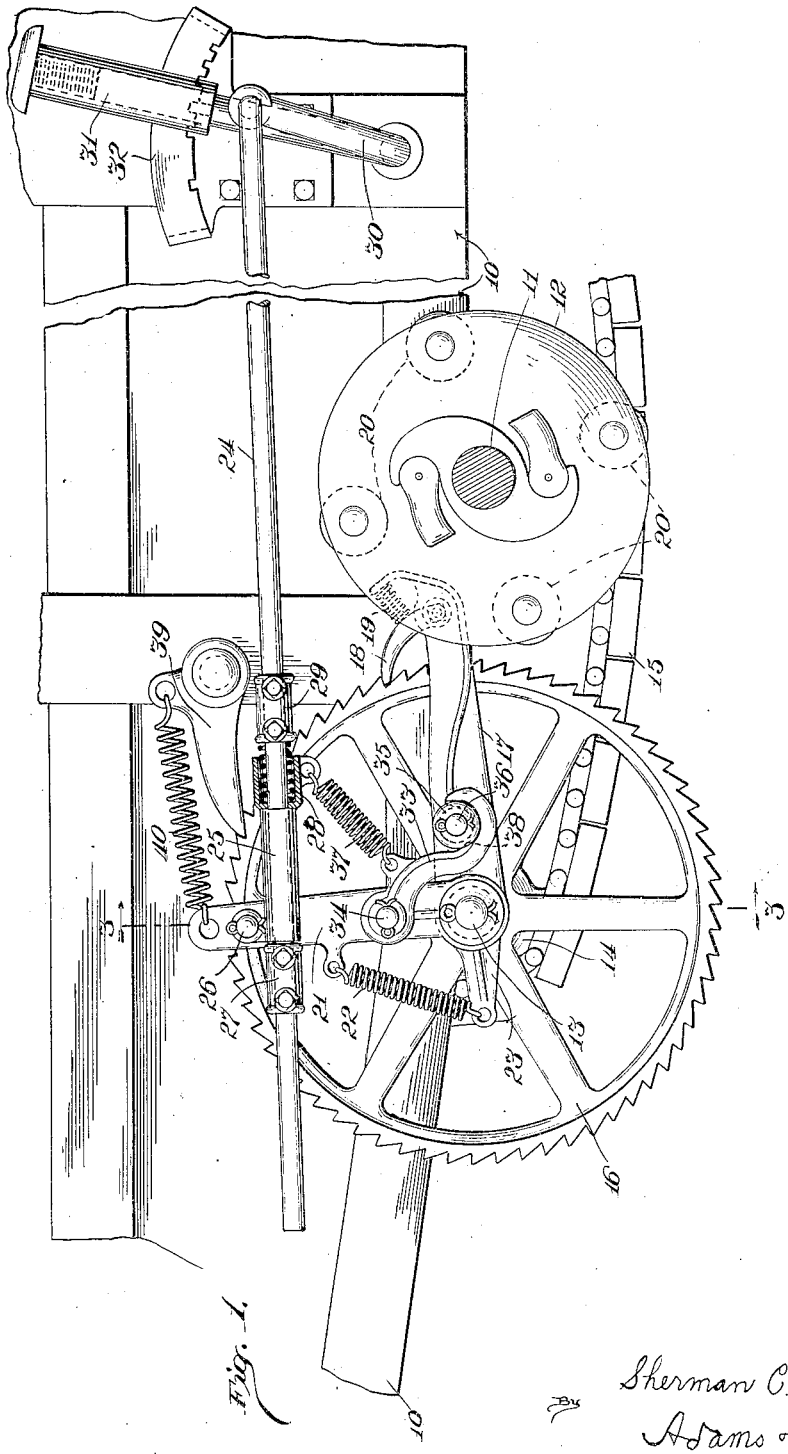

UNITED STATES PATENT OFFICE.

SHERMAN C. HARTSOCK, OF MOLINE, ILLINOIS, ASSIGNOR TO D. M. SECHLER IMPLEMENT & CARRIAGE COMPANY, OF MOLINE, ILLINOIS, A CORPORATION OF ILLINOIS.

FERTILIZER-DISTRIBUTER.

1,354,645.   Specification of Letters Patent.   Patented Oct. 5, 1920.

Application filed August 28, 1919. Serial No. 320,413.

*To all whom it may concern:*

Be it known that I, SHERMAN C. HARTSOCK, a citizen of the United States, and a resident of Moline, in the county of Rock Island and State of Illinois, have invented certain new and useful Improvements in Fertilizer-Distributers, of which the following is a specification, reference being had to the accompanying drawings.

My invention relates to fertilizer distributers of the type comprising an endless conveyer by which manure or other fertilizer is adapted to be moved intermittently along a wagon body and delivered to a suitable distributing means at the rear end thereof, and it is the object of my invention to provide improved means for effecting the intermittent movement of such an endless conveyer. The preferred means by which I have accomplished my object are illustrated in the accompanying drawings and are hereinafter specifically described. That which I believe to be new and desire to cover by this application is set forth in the claims.

In the drawings,—

Figure 1 is a side elevation of my improvements applied to a suitable wagon body, a portion only of which is shown;

Fig. 2 is a view similar to Fig. 1, but showing a changed position of the parts;

Fig. 3 is a vertical cross-section taken on line 3—3 of Fig. 1; and

Fig. 4 is a bottom plan view of the actuating member by which intermittent motion is given to the endless conveyer.

Referring to the several figures of the drawings in which corresponding parts are indicated by the same reference characters,—

10 indicates a wagon bed of any approved type supported in part upon a rear axle 11. A disk or wheel 12 is mounted upon the axle 11 and is adapted to be driven continuously during the forward movement of the vehicle through the medium of any suitable mechanism. A shaft 13 is revolubly mounted in rear of the axle 11, being provided with a plurality of sprockets 14 which are adapted to support and drive an endless conveyer 15 of any suitable type, intermittent driving means being applied to the endless conveyer through the medium of the devices hereinafter described acting upon a ratchet wheel 16 fixedly mounted upon the end of the shaft 13.

The means for intermittently actuating the ratchet wheel 16 comprises an arm 17 journaled upon the outer end of the shaft 13 (see Fig. 3), such arm carrying at its outer end a pawl 18 pivotally mounted thereon. A spring 19 bearing upon the pawl 18 serves to hold such pawl yieldingly in contact with the periphery of the ratchet wheel 16. The arm 17 is adapted to be reciprocated vertically by means of lugs 20 carried by the disk or wheel 12, the lugs in the construction shown being in the form of rollers. As the wheel 12 rotates in clockwise direction as seen in Fig. 1, the lugs or rollers 20 are brought successively into contact with the end portion of the arm 17, serving to move such arm upward, thereby turning the ratchet wheel 16 in counter-clockwise direction as seen in Fig. 1. When a stud or roller 20 moves out of contact with the end of the arm 17, the arm moves downward, carrying the pawl 18 into contact with another tooth of the ratchet wheel 16 preparatory for another actuation of such ratchet wheel.

An arm 21 is rotatably mounted about the shaft 13, in the construction shown being journaled upon an extended hub portion of the arm 17. A spring 22 is interposed between the arm 21 and a rearwardly-extending arm 23 carried by the arm 17, such spring serving to draw the arm 17 yieldingly downward with reference to the arm 21, as will be readily understood. The spring 22 is employed to insure the arm 17 moving downward for proper coöperation with the ratchet wheel 16 when such arm 17 is freed from contact with the lugs or rollers 20.

The regulation of the effective stroke of the arm 17 and pawl 18 is accomplished through the use of adjustable means for regulating the distance which the arm 17 is permitted to move downward with reference to the ratchet wheel 16. This controlling means comprises a rod 24 which is slidably mounted in a sleeve 25 which is pivotally mounted upon a pin 26 carried by the arm 21. A stop device in the form of a sleeve 27 is secured by means of set screws upon the end portion of the rod 24, serving to limit the movement of the rod in one direction with reference to the arm 21. A compression spring 28 is interposed between the forward end of the sleeve 25 and a stop device 29 also in the form of a sleeve secured upon the rod 24 by means of set screws. The stop device 29 in coöperation with the spring 28 serves to hold the rod 24 yieldingly against backward movement with reference to the arm 21. The forward end of the rod 24 is pivotally connected with a crank arm 30, the position of which is controlled by a lever 31 adjustable with reference to a sector 32 mounted upon the wagon bed 10. As the lever 31 is adjusted backward and forward, the arm 21 will be correspondingly moved about the shaft 13, serving through means hereinafter described to limit the downward movement of the arm 17.

The means employed for limiting the downward movement of the arm 17 with reference to the arm 21 comprises a hooked member 33 pivotally mounted upon a pin 34 carried by the arm 21, the hook of this member being in position to receive a roller 35 revolubly mounted upon a pin 36 carried by the arm 17. This hooked member has another function moreover in connection with the downward movement of the arm 17. A contractile spring 37 is interposed between the member 33 and the sleeve 25 serving to draw the member 33 yieldingly forward and upward. Thus when the arm 17 is moved to its uppermost position as shown in Fig. 2 the member 33 is moved upward, being kept constantly in contact with the roller 35 through the medium of the spring 37. As will be readily understood from an inspection of Fig. 2, when the wheel 12 is rotated slightly in clockwise direction as seen in Fig. 2 the arm 17 will be free to drop under the action of the spring 22, after the roller 20 has passed out of contact with such arm, whereupon the roller 35 will come in contact with a diagonally-disposed portion 38 of the member 33 the shape and disposition of which are such that the spring 37 acts as a cushion for the latter part of the downward stroke of the arm 17, serving to bring the arm gradually and easily to rest at the limit of the downward movement, the spring 37 having a differential effect on the movement of the arm 17 increasing as the end of the movement approaches. The spring 37 is thus seen to oppose the downward movement of the arm 17, but its effect upon such arm is relatively small as compared to that of the spring 22 which has a direct leverage on the arm. By means of the spring-actuated member 33, the arm 17 is prevented from being brought down into sharp engagement with the studs or rollers 20, the roller 35 being always stopped by the hook portion of the member 33 before a stud or roller 20 is brought into contact with the arm for the next succeeding stroke. While I prefer to employ a roller 35 for effecting the shifting engagement between the arm 17 and the member 33, I do not desire to limit myself to that construction except as specifically claimed.

For preventing a backward movement of the endless conveyer 15 when the arm 17 is moved downward, I have provided a pawl 39 pivotally mounted upon the wagon bed 10, such pawl being yieldingly held in engagement with the ratchet wheel 16 by means of a spring 40 interposed between the pawl and the arm 21.

What I claim as my invention and desire to secure by Letters Patent, is—

1. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and means adapted by engagement with said arm independently of said contact devices to limit the movement of the arm into the path of said contact devices, said means comprising a cushioning element in constant engagement with the arm.

2. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and a member having a diagonally-disposed part adapted to have shifting engagement with said arm for limiting the movement of the arm into the path of said contact devices.

3. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, a hooked part pivotally mounted adjacent to said arm and adapted to engage the arm for limiting its movement into the path of said contact devices, and adjustable means for varying the point at which said hooked part is adapted to act.

4. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and pivoted yielding means adapted by shifting engagement with said arm to have a differential cushioning effect upon the movement of the arm into the path of said contact devices.

5. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, a movable member, and yielding means holding said movable member in constant engagement with said arm adapted to cushion the movement of the arm into the path of said contact devices.

6. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, a movably-mounted device adapted upon the inoperative stroke of said arm to be given a movement by shifting engagement with said arm, and yielding means adapted to hold said movable device in constant engagement with said arm and to oppose the movement of said device by said arm.

7. An intermittent feed mechanism comprising in combination a ratchet wheel, a pivoted arm, a pawl pivotally connected with said arm and in engagement with said ratchet wheel, means adapted to engage said arm intermittently for rocking the arm and rotating the ratchet wheel, a second arm pivotally mounted on the axis of said first-named arm, and cushioning means carried by said second arm adapted to limit the movement of the first-named arm toward the rocking means.

8. An intermittent feed mechanism comprising in combination a ratchet wheel, a pivoted arm, a pawl pivotally connected with said arm and in engagement with said ratchet wheel, means adapted to engage said arm intermittently for rocking the arm and rotating the ratchet wheel, a second arm pivotally mounted adjacent to said first-named arm, means for adjusting the position of said second arm, and a spring-actuated pivoted cushioning member carried by said second arm adapted by shifting engagement with said first-named arm to limit the movement of the first-named arm toward the rocking means.

9. An intermittent feed mechanism comprising in combination a ratchet wheel, a pivoted arm, a pawl pivotally connected with said arm and in engagement with said ratchet wheel, means adapted to engage said arm intermittently for rocking the arm and rotating the ratchet wheel, a second arm pivotally mounted adjacent to said first-named arm, means for adjusting the position of said second arm, a hook pivotally mounted on said second arm and having a diagonally-disposed portion adapted to have a shifting engagement with said first-named arm, and yielding means tending to hold said hook in position to cushion the downward movement of said first-named arm.

10. An intermittent feed mechanism comprising in combination a ratchet wheel, a pivoted arm, a pawl pivotally connected with said arm and in engagement with said ratchet wheel, a constantly-moving member adapted to intermittently rock said pivoted arm to cause a turning of the ratchet wheel, and a pivotally-mounted device yieldingly held in constant engagement with said arm 11. An intermittent feed mechanism comprising in combination a ratchet wheel, a pivoted arm, a pawl pivotally connected with said arm and in engagement with said ratchet wheel, a constantly-moving member adapted to intermittently rock said pivoted arm to cause a turning of the ratchet wheel, and a pivotally-mounted device yieldingly held in shifting engagement with said arm.

12. An intermittent feed mechanism comprising in combination a ratchet wheel, a pivoted arm, a pawl pivotally connected with said arm and in engagement with said ratchet wheel, a constantly moving member adapted to intermittently rock said pivoted arm to cause a turning of the ratchet wheel, a spring connected with said arm and tending to move it into the path of said constantly-moving member, a pivotally-mounted device adapted to be given a movement about its pivot by an inoperative stroke of said arm, and a second spring yieldingly opposing such movement of said device.

13. An intermittent feed mechanism comprising in combination a ratchet wheel, an arm alongside of said ratchet wheel and pivoted intermediate its ends, a constantly rotating member adapted to intermittently rock said pivoted arm, a pawl adjacent to one end of the arm and adapted to engage the ratchet wheel, a spring connected with the other end portion of the arm and normally tending to rock the arm into the path of said rotating member, and a second spring connected with the arm intermediate of the pivot of the arm and the point of attachment of the pawl, said second spring acting upon the arm in opposition to the first-mentioned spring.

14. An intermittent feed mechanism comprising in combination a ratchet wheel, an arm alongside of said ratchet wheel and pivoted intermediate its ends, a constantly rotating member adapted to intermittently rock said pivoted arm, a pawl adjacent to one end of the arm and adapted to engage the ratchet wheel, a spring connected with the other end portion of the arm and normally tending to rock the arm into the path of said rotating member, a movable device having shifting engagement with said arm at a point between the pivot of the arm and the point of attachment of the said pawl and adapted to be moved by an inoperative stroke of said arm, and a spring connected with said device and acting to hold the device in constant engagement with the arm and serving to oppose the movement of said device by said arm.

15. An intermittent feed mechanism comprising in combination a ratchet wheel, an arm alongside of said ratchet wheel and pivoted intermediate its ends, a constantly rotating member adapted to intermittently rock said pivoted arm, a pawl adjacent to one end of the arm and adapted to engage the ratchet wheel, a spring connected with the other end portion of the arm and normally tending to rock the arm into the path of said rotating member, and a resiliently-supported device engaging that portion of the arm between the pivot of the arm and the point of attachment of the said pawl.

16. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and a spring-actuated hook adapted by engagement with said arm to cushion the movement of the arm into the path of said contact devices.

17. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and a spring-actuated diagonally-disposed part adapted by engagement with said arm to cushion the movement of the arm into the path of said contact devices.

18. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, and a spring-actuated hook having a diagonally-disposed part adapted by engagement with said arm to cushion the movement of the arm into the path of said contact devices, and hook serving also to limit the movement of the arm.

19. An intermittent feed mechanism comprising in combination a ratchet wheel, a constantly-rotating member provided with a plurality of contact devices, an arm adapted to move into the path of said contact devices successively and to be displaced thereby, a pawl on said arm adapted to rotate said ratchet wheel when said arm is moved by said contact devices, a spring-actuated hook having a diagonally-disposed part adapted by engagement with said arm to cushion the movement and to limit the movement of the arm into the path of said contact devices, and adjustable means for varying the point at which said hook is adapted to act.

20. An intermittent feed mechanism comprising in combination a ratchet wheel, a constantly-rotating member provided with a plurality of contact devices, a vertically disposed arm movably mounted adjacent to said rotating member, adjustable means for regulating the position of said arm, a horizontally-disposed arm movably mounted with respect to said first-named arm and adapted to move into the path of said contact devices successively and to be displaced thereby, a pawl on said horizontally-disposed arm adapted to rotate said ratchet wheel when the arm is moved by said contact devices, and a hook pivotally mounted on said first-named arm adapted to engage said second-named arm for limiting the movement of said second-named arm into the path of said contact devices.

21. An intermittent feed mechanism comprising in combination a ratchet wheel, a constantly-rotating member provided with a plurality of contact devices, a vertically disposed arm movably mounted adjacent to said rotating member, adjustable means for regulating the position of said arm, a horizontally-disposed arm movably mounted with respect to said first-named arm and adapted to move into the path of said contact devices successively and to be displaced thereby, a pawl on said horizontally-disposed arm adapted to rotate said ratchet wheel when the arm is moved by said contact devices, a hook pivotally mounted on said first-named arm adapted to engage said second-named arm for limiting the movement of said second-named arm into the path of said contact devices, and yielding means serving to hold said hook in operative contact with said second-named arm as such arm is moved by the contact devices.

22. An intermittent feed mechanism comprising in combination a ratchet wheel, a constantly-rotating member provided with a plurality of contact devices, a vertically disposed arm movably mounted adjacent to said rotating member, adjustable means for regulating the position of said arm, a horizontally-disposed arm movably mounted with respect to said first-named arm and adapted to move into the path of said contact devices successively and to be displaced thereby, a pawl on said horizontally-disposed arm adapted to rotate said ratchet wheel when the arm is moved by said contact devices, a hook pivotally mounted on said first-named arm and having a diagonally-disposed part adapted to engage said second-named arm, and a spring holding said hook in contact with said second-named arm as the arm is moved by said contact devices, said hook serving to cushion and limit the movement of said second-named arm into the path of said contact devices.

23. An intermittent feed mechanism comprising in combination a ratchet wheel, a constantly-rotating member provided with a plurality of contact devices, a vertically disposed arm movably mounted adjacent to said rotating member, adjustable means for regulating the position of said arm, a horizontally-disposed arm movably mounted with respect to said first-named arm and adapted to move into the path of said contact devices successively and to be displaced thereby, a pawl on said horizontally-disposed arm adapted to rotate said ratchet wheel when the arm is moved by said contact devices, a roller revolubly mounted on said second-named arm, and a hook pivotally mounted on said first-named arm adapted to engage said roller for limiting the movement of said second-named arm into the path of said contact devices.

24. An intermittent feed mechanism comprising in combination a ratchet wheel, a constantly-rotating member provided with a plurality of contact devices, a vertically disposed arm movably mounted adjacent to said rotating member, adjustable means for regulating the position of said arm, a horizontally-disposed arm movably mounted with respect to said first-named arm and adapted to move into the path of said contact devices successively and to be displaced thereby, a pawl on said horizontally-disposed arm adapted to rotate said ratchet wheel when the arm is moved by said contact devices, a roller revolubly mounted on said second-named arm, a hook pivotally mounted on said first-named arm and having a diagonally-disposed part adapted to engage said roller, and a spring holding said hook in contact with said roller as the second-named arm is moved by said contact devices, said hook serving to cushion and limit the movement of said second-named arm into the path of said contact devices.

SHERMAN C. HARTSOCK.